Figure 1:
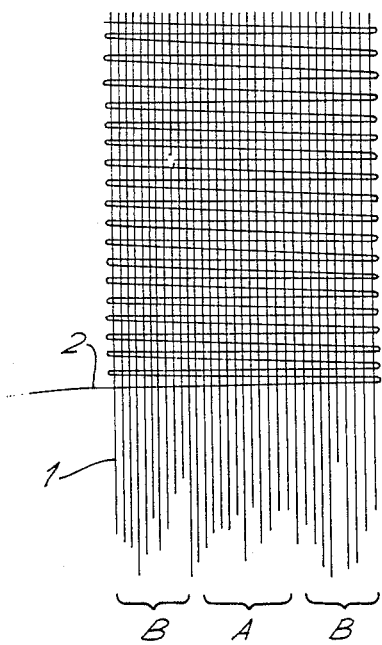

United States Patent [19]

Pithouse et al.

[11] Patent Number: 4,803,103
[45] Date of Patent: * Feb. 7, 1989

[54] RECOVERABLE ARTICLE

[75] Inventors: Kenneth B. Pithouse, Lesulis, France; Thomas A. Kridl, Union City; James T. Triplett, Livermore, both of Calif.

[73] Assignee: Raychem Corporation, Menlo Park, Calif.

[*] Notice: The portion of the term of this patent subsequent to Dec. 2, 2003 has been disclaimed.

[21] Appl. No.: 945,186

[22] Filed: Dec. 22, 1986

Related U.S. Application Data

[63] Continuation of Ser. No. 567,127, Dec. 30, 1983, abandoned.

[30] Foreign Application Priority Data

Jan. 6, 1983 [GB] United Kingdom ............... 8300222
Aug. 16, 1983 [GB] United Kingdom ............... 8322004

[51] Int. Cl.⁴ .................. F16L 11/02; H01R 4/00
[52] U.S. Cl. .................. 428/34.5; 138/123; 138/177; 174/DIG. 8; 174/84 R; 428/34.9; 428/35.1

[58] Field of Search ............... 428/36, 913; 174/DIG. 8, 84 R; 138/177, 178, 123; 156/86; 264/230

[56] References Cited

U.S. PATENT DOCUMENTS

| 2,356,948 | 6/1940 | Reed | 156/86 |
| 3,105,492 | 10/1963 | Jeckel | 139/387 R |
| 3,466,210 | 1/1966 | Waseham | 156/86 |
| 4,024,002 | 5/1977 | Lott | 428/913 |
| 4,055,201 | 10/1977 | Fowler et al. | 139/387 R |
| 4,384,906 | 5/1983 | Molinari et al. | 428/36 |
| 4,569,868 | 2/1986 | DeBlauwe et al. | 428/35 |
| 4,626,458 | 12/1986 | Pithouse et al. | 428/36 |

FOREIGN PATENT DOCUMENTS 52-25290 2/1977 Japan .

Primary Examiner—George F. Lesmes
Assistant Examiner—James J. Seidleck
Attorney, Agent, or Firm—A. Stephen Zavell; Herbert G. Burkard

[57] ABSTRACT

A recoverable article comprises a fabric having zones of different or uniformly varying recovery forces or ratios. The fabric can be made impervious and used for environmental protection.

24 Claims, 3 Drawing Sheets

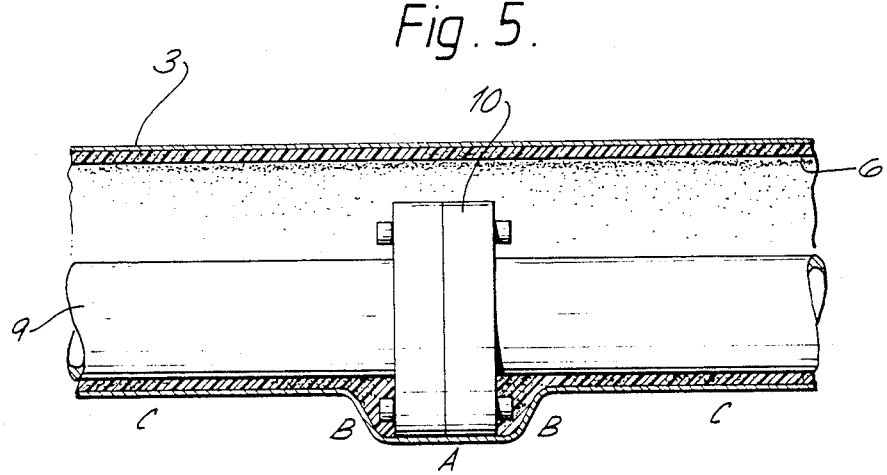
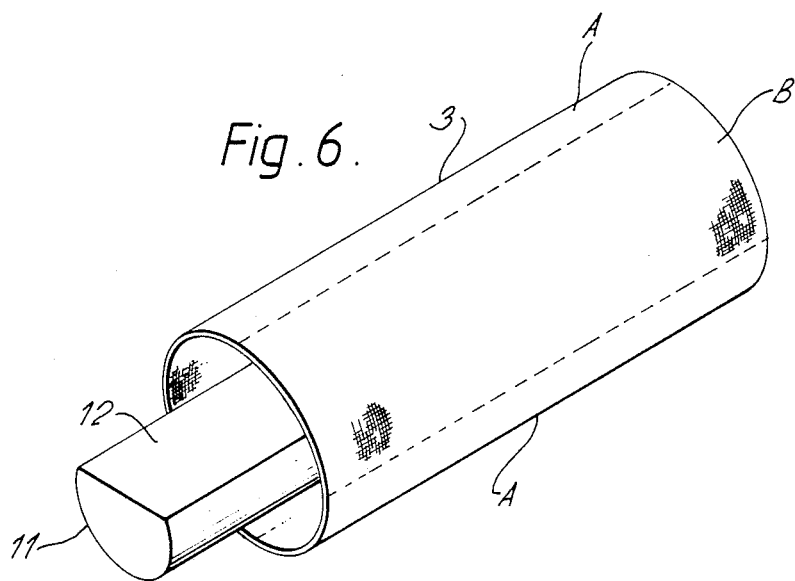

RECOVERABLE ARTICLE

This application is a continuation of application Ser. No. 567,127, filed Dec. 30, 1983, now abandoned.

The present invention relates to a recoverable article suitable for environmental protection of junctions in elongate substrates, such as splices in cables, particularly in telecommunications cables, or pipes or other supply lines. The following description will be made primarily in terms of the protection of a cable splice, but it is to be understood that the invention is applicable to the enclosure of any substrate.

It is frequently necessary to protect such junctions against the environment in order that the cables or other substrates may continue to function properly. Protection generally has to be provided against moisture, corrosive chemicals as well as insect and animal damage etc. The intention when enclosing a junction such as a cable splice is to make good the original cable insulation that had to be removed in order to connect the conductors, and it is generally required that the life-time of the seal provided by the new enclosure be comparable to that of the original cable insulation. It will be appreciated therefore that the material of the enclosure must provide a highly resistant barrier for a considerable period of time, and must conform well to the shape of the underlying substrate.

There is a further consideration relevant to the design of enclosures for substrates such as cable splices, and that is the ability to retain pressure. Many types of cables and splice cases are pressurised during use, are assessed in terms of pressure retention to determine their quality, or become subject to incidental pressurisation during use. The importance of this consideration is of course different in each of these three situations, but it is accepted that the ability to retain some degree of pressure is a necessary feature of a splice case if environmental protection is to be achieved.

The most stringent requirements are for a splice case for pressurised cables, such as main cables in a telecommunications system. These cables are pressurised to prevent ingress of water into the event of damage and to provide a means of fault detection. Here the product must withstand a pressure of the order of 10 psi (70 kPa) throughout its life, and a functional test designed to mirror such long term performance requires impermeability at, say, 70 kPa over 10 eight hour cycles between −40° C. and +60° C. in air (Bell cycle). An alternative cycle is in water over four hours at 105 KPa between 5° and 50° C. In addition to this cyclical environmental test, the product may be tested for integrity by pressurisation at 150 kPa in water for about 15 minutes at 23° C. No leak should be observable. A product that is to operate continuously at pressure should also possess long term creep resistance if it is not to become significantly distorted during use.

In telecommunications distribution cables, an ability to retain pressure is required as an indication of completeness of environmental sealing, although the cables are not pressurised during use. Various temperature/pressure cycles have been devised for this purpose, and one that is preferred is a modified Bell Cycle which involves temperature variation from −40° to 60° C. over 8 hours at an air pressure of 40 kPa. The splice case should show no leak after 10 cycles. An alternative cycle is a temperature variation between room temperature and 70° C. at a pressure of 105 KPa over 4 hours.

These and other cable splice cases may become pressurised for example through being exposed to sunlight, and in such cases it is necessary that the splice case be able to maintain this temporary, and generally rather low, pressure if the environmental seal is not to fail.

Many of today's splice cases for pressurised cables are large and heavy, and consist of many components. For example, cast iron case halves are bolted together around the cable splice, the cable entries being sealed by a complex arrangement of compression collars, clamps, sealing washers and tape. Variations on this system exist but there remains the problem of sealing the cable to the splice case at their points of entry. A large stock of parts must be kept if various sizes of cables are to be joined, or if the number of cables per splice case is likely to vary. A further problem is that installation is difficult and lengthy.

The problems associated with such multi-part, rigid, splice cases are avoided by the use of recoverable sleeves: installation is quick, and a variety of sizes and numbers of joined cables can be enclosed with a small number of parts. The use of a sleeve of a suitable recoverable polymeric material, together with an adhesive can provide excellent environmental sealing and pressure retention.

If a good environmental seal is to be obtained, especially if imperviousness to air is required, it is desirable that the recoverable sleeve can conform closely to the shape of the substrate and grip the substrate tightly: where the substrate is a circular cylinder and not easily damaged this wil generally present no problem, but for irregular or weak substrates some buckling of the sleeve may occur if the sleeve is badly installed thus allowing leak paths. Splitting over sharp transitions is another problem with conventional sleeves particularly at regions of high unresolved recovery.

We have discovered that these problems that result from mismatching of size and shape of sleeve and substrate can be overcome by providing zones of different recovery ratios across the surface of the sleeve. By this technique the sleeve or other recoverable article can be made to change shape, as well as size, on installation. The article before recovery can therefore be flat, or any other suitable shape, but become shaped as recovery progresses.

It is however difficult and expensive to provide such zoned recovery when using the presently available techniques of providing recoverable articles, such as extrusion or moulding followed by expansion. What we have done is to produce this zoning in a recoverable fabric, where this property can be localised either during manufacture or by subsequent treatment.

Thus, the present invention provides a method of enclosing a contoured substrate, which comprises: installing around the object a recoverable fabric having zones of different uniformly varying recovery ratios or forces or installed modulus whose arrangement corresponds to the contours of the object; and recovering the fabric into engagement with the object. Zones of ratio, force and modulus may be provided, which may but need not coincide.

The present invention also provides a recoverable article suitable for enclosing a contoured substrate and comprising a recoverable fabric having zones of different or uniformly varying recovery ratios or forces, such that on recovery the volume enclosed by the cover portion changes shape to conform to the substrate.

The article as a whole will therefore recover, on heating or other treatment, towards an original shape from which it has previously been deformed, or towards a new shape governed by the recovered configuration of the fibres it contains, or towards another new configuration from which the article as a whole has not been previously deformed.

The article will generally comprise a shrinkable (preferably heat-shrinkable) sleeve comprising preferably polymeric fibres exhibiting (in the final product at least) the property of elastic or plastic memory, which property is described, for example, in U.S. Pat. Nos. 2,027,962; 3,086,242 and 3,597,372. As is made clear in, for example, U.S. Pat. No. 2,027,962, an original dimensionally heat-stable form may be a transient form in a continuous process in which, for example, an extruded tube is expanded (or in the present case a fabric tube is expanded or fibres are stretched, generally during their formation) to a dimensionally heat unstable form in a separate stage.

In the production of polymeric heat-recoverable articles in general, the polymeric material may be cross-linked at any stage in the production of the article that will improve temperature stability while enhancing the desired dimensional recoverability. One manner of producing a heat-recoverable article comprises stretching or shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

When the fibre is cross-linked by irradiation it is convenient to incorporate the cross-linking step into the overall manufacture of the fibre. The fibre can be extruded, stretched at a temperature below its melting temperature, preferably by an amount of from 800-2000%, then subjected to irradiation to effect cross-linking. A less preferred way of making the fibre is to extrude the material, irradiate to cross-link, then heat the fibre preferably to above its melting temperature, stretch the fibre, and then cool. HDPE fibres are preferably irradiated with a dose of from about 5 to about 35 megarads, more preferably from about 5 to about 25 megarads, and most preferably from about 7 to about 18 megarads, especially from 10 to about 18 megarads. The gel content that results is preferably at least 20%, more preferably at least 30%, and most preferably at least 40%. In practice a maximum of about 90% will be sufficient for most purposes.

In other articles, as described, for example, in British Pat. No. 1440524, an elastomeric member is held in a stretched state by a second member, which, upon heating weakens and thus allows the elastomeric member to recover.

When recoverable by heat, the recovery temperature is preferably 60° C. or more, more preferably from 80°-250° C., such as 120°-150° C.

The Zones are preferably large compared to the size of the fibres. Variations in recovery ratio are known in unrelated fields such as clothing where a puckering is desired to give the textile a certain surface texture or hand. In UK Pat. No. 1310691 (Curlator Corporation) for example there is described the production of lofty non-woven fabrics made from acrylic fibres by blending fibres possessing different levels of heat shrinkage. The intention and result is that the fabric buckles and loops, providing the lofy appearance. A woven fabric is described in UK Pat. specification No. 1341114 where differential treatment results in a chequer board effect. Again, the intention is a texturing or structuring effect for the embellishment of clothing.

In contrast to this, we provide long range zones (each of constant, but different, or of uniformly varying recovery ratio or force) in order substantially to avoid buckling or other surface irregularity, to localize sealing and prevent damage to other parts of a substrate, and to provide zones of strength in the installed product. The size of the zones that is acceptable will depend on their geometrical pattern. For instance quite small zones of the shape of bands around a recoverable sleeve will be acceptable, and of particular use in the covering, say, of pipe joints where abutting flanges must be accommodated. The chequer board is likely to cause buckling even with large squares, and could not therefore provide a cover portion where the volume enclosed changes shape as a result of the differential recovery. It is a preferred feature, therefore, that the zoning occures only in one direction across the surface of the fabric.

It is preferable that the fabric before recovery is even, and assumes, by virtue of the zoning, its desired shape on free recovery. The surface of the fabric is therefore preferably substantially developable (the geometrical term meaning an ability to be projected or rolled out onto a plane without stretching or shrinking) before recovery and not developable after recovery. This can provide the considerable advantage of reducing storage and transport space, and simplifying manufacture. The fabric may, however, have one non-planar shape before recovery and a planar or different non-planar shape after recovery.

Where the fabric is used for environmental sealing it will generally be hollow and preferably have the form of a sleeve (which may be of the tubular or wrap-around variety). The following description will therefore be primarily concerned with recoverable sleeves, but it is to be understood that final shapes, such as branch-offs, boots and udders, which may or may not have sleeve portions as part of a larger body are included.

A sleeeve which is originally, say, cylindrical may be provided with greater recovery at one or both ends, and thus assume a complex shape having a central portion of larger cross-section and end portions which taper. A further desirable feature here is a greater modulus (and generally therefore greater recovery stress) at the central region; this is because the internal pressure will result in a greater hoop stress at the region of larger diameter. Such an article is of particular use for encapsulating splices in supply lines such as telecommunication cables where the splice bundle is considerably larger than the cables it joins. Conventionally such splices are protected by installing a shaped liner over the splice bundle and a uniformly recoverable sleeve over the liner. The liner protects the splice bundle from the recovery force of the sleeve, but allows the sleeve to engage the cables at either side of the splice. The present invention allows such a splice to be encapsulated by a sleeve alone, since one can easily ensure that the central region has no recovery or insufficient recovery to damage the splice bundle. As before, the end portions will recover into contact with the cables. A liner may nonetheless still be desirable to improve impact and axial strength.

As mentioned above, shaped substrates such as flanges on pipe joints can be protected by the article of the invention since bands of fabric, corresponding to the larger diameter of the flange, can be made of lower recovery than the remainder of the fabric. As a result, the fabric will not be damaged as it recovers over the flange since the recovery ratio in this critical region is reduced. The invention is therefore of particular value in the encapsulation or protection of substrates having sharp transitions in size; it is under these conditions that uniformly recoverable extruded sheet material is likely to split since it is unable to match the substrate. The article may, of course, be used to protect or repair lengths of pipe or cables as well as joints.

Other uses of the article of the invention include the sealing of terminations of a cable, pipe or other supply lines. Here the fabric must match the supply line and the generally significantly larger object to which it is joined. The fabric can be chosen such that it recovers into indents in the object to prevent it from disengaging due to any axial tension put on the supply line.

The above examples describe instances where recovery of a sleeve is radial and the variation in recovery occurs along the length of the sleeve. The sleeve may however have axial recovery, and the zones be longitudinal strips spaced around the periphery of the sleeve. The effect of different recovery in this case will be to cause an originally straight cylinder to become bent. This is of use in encapsulating pipe bends for example since a tightly fitting cover can be applied to the pipe leaving no air voids between the pipe and the fabric.

A further possibility is to provide radial recovery where the zones occur around the circumference. Although, in general, recovery stress will be transmitted uniformly around the circumference, this embodiment can be used to enhance the sealing provided by sleeves around cylindrical substrates of non-circular cross-section. The reason for this is that the sleeve recovers into contact with the substrate, friction between the two becomes important and the sleeve is not able to slip to ensure tightness around it entire circumference.

Two or more of these ideas can be combined in a single article.

The zones of different recovery can be provided in one or more ways. Firstly, fibres of different recovery may be used in the different zones. This is primarily applicable to woven fabrics, or weft or warp insertion knits where the insertion is recoverable. An alternative is to treat the fabric differentially over its surface to cause different parts to become recoverable to different extents, or to retain to different extents recovery that has been uniformly imparted. Such treatment may be irradiation, the application of prorads, the use of a deactivating species, the application of an adhesive which prevents or reduces recovery of the fibres, or the insertion of further fibres of higher or lower recovery than that of the fabric. Two or more of these techniques may be combined. In a preferred process a woven fabric is produced using a recoverable warp, where the various warp ends have different properties to produce the desired zones in the final fabric. For example, the ends could be arranged in groups having different draw ratios or recovery stress, or different loadings of proads and/or antirads. In this last example, the fabric that results could be subjected to a *uniform* irradiation in order to produce the *zoned* recovery ratios of recovery stress.

By reducing the beam response of the warp ends at the edges of a recoverable sleeve the recovery *ratio* will not be diminished, and by increasing the beam response at the central region the recovery *stress* at the region will be improved. This is just the combination of properties required in a splice case: namely high recovery at the ends and high strength in the centre. The invention therefore provides a simple way of making an improved splice case.

It is preferred that the fabric is substantially impervious, and the extent to which it need be will of course depend on the use of the article. Where the article is used to seal a splice between pressurized cables a high imperviousness will be desirable if energy and pressurization medium are not to be wasted. In other situations imperviousness to water, oil, fuel or hydraulic fluids may be required. A degree of perviousness will, in general, be tolerable depending on the nature of the substrate and on the length of time that the assembly will be in use.

The means for rendering the fabric substantially impervious may, for example, be a polymeric material (referred to herein as a matrix) used in conjunction with, bonded to, or extending throughout the recoverable fabric, or it may be the liner where the liner is of substantially sheet form rather than, say, a cage, or it may be some means whereby the nature of the fabric is altered. We have found that a recoverable fabric rendered impervious can have excellent pressure retention where imperviousness to air is required. The ability of the sleeve to retain pressure is not simply a question of porosity of the material, although it must ultimately be substantially free from holes, but is determined also by the ability of the material to withstand hoop stresses that are generated by pressure within the sleeve. It is with regard to this second effect that recoverable fabrics have been found to be particularly good. Fabric sleeves of small thickness have been found to be able to resist high pressures without significant ballooning or creep. It is furthermore surprising that this beneficial feature can be made use of in spite of the initial porosity of fabrics.

Fabrics also offer considerable advantages over, say extruded, sheets in the ease with which they can be reinforced by the insertion of special fibres. These features provide further advantages of the use of fabrics in addition to the ease with which the zones of recoverability can be provided.

The sleeve (and any liner used) may be made in tubular form or wrap-around form. Wrap-around sleeves and liners are preferred since they can be installed around substrates having no free ends. This is particularly useful when a splice in a telephone cable is to be enclosed after the repair of only a few of the many conductors it contains. If the sleeve and liner were tubular, the entire cable would have to be severed for installation. Wrap-around products are also useful where space is limited; a wrap-around sleeve can be installed where the amount of substrate exposed merely equals the width of the sleeve, a tubular sleeve however requires room for it to be positioned along the substrate away from the splice region while the splice is being made.

Several matters are to be borne in mind when designing the recoverable sleeve, and the first to be considered will be the recovery ratios. The recovery ratios should be sufficient to allow the sleeve to be installed over the largest parts of the substrate and to recover into contact with the smallest parts. In a splice between telephone cables, the splice bundle will in general be bigger than the cable diameter by a factor of 2-6, and a sleeve having at its ends a recovery ratio of at least that factor will be suitable. The extent of recovery can also be expressed by quoting the change in a dimension as a percentage of the dimension before recovery. Expressed thus, recovery is preferably at least 20%, more preferably at least 40%, particularly at least 50%, more particularly at least 75%. A sleeve having a lower recovery ratio than the ratio between the size of the splice and that of the cables may be used if the sleeve is made in a shape more or less corresponding to the shape of the cable splice. If a shaped sleeve is used it will usually have to be wrap-around since it will not be capable of being slid over the splice bundle. Since greater recovery may be needed at the ends where the sleeve is to seal to the cables, the fabric may be made having zones of higher recovery at its ends. This may be achieved by using zones of different fibres (for example, different recovery ratio, different recovery stress or different beam response) or a single fibre type that has been differentially treated, such as by subjecting it to different degress of irradiation.

The type of fibres and construction of the fabric will now briefly be considered, although it is envisaged that any weave or knit or non-woven agglomeration of any fibres may be used providing the required degree of recovery can be induced For the present purposes the term weave is to include braids, since the products are similar although the methods of production are different; the terms warp and weft are not strictly applicable to braids but when used herein with reference to weaves can be considered to relate also to braids by arbitrary selection of fibre directions. Recoverability is preferably provided by weaving or knitting fibres that are already recoverable, rather than by deforming a fabric woven or knitted from dimensionally stable fibres. In the first of these possibilities, the recovery ratio of the fabric will depend not only on the recovery ratio of its fibres, but also on the type of weave or knit and on the means employed to provide substantial imperviousness.

In general, the fabric will be constructed so that the recoverable fibres can effectively run at least in the direction where recovery is required. In a weave, therefore, the warp only, or the weft only, or both weft and warp, may be recoverable. In more complicated weaves, such as a triaxial weave, one or both of the warps may be recoverable. An advantage of the use of fabrics is that perfect uniaxial recovery, or a chosen split in recovery between two directions, may be achieved. Where the fabric is knitted, use of a recoverable fibre will produce recovery in all directions, although selective recovery can be provided by controlled warp or weft insertion.

Different effects, in terms of for example, final recovery ratio, strength and flexibility, will result from different types of weave or knit even if the same fibres are used. Examples of type of weave include plain, twill, broken twill, herring bone, satin, sateen, leno, hop sack, sack, matt and combinations of these. The weave may be single ply, or if higher density or thicker fabrics are desired multiple ply weaves may be used. For the present preferred purposes, where a warp recoverable fabric is to recover over a liner having a transition, high warp recovery combined with low crimp in any single weft insertion is required. Hence fabrics of high float, such as satins or sateens, which can accommodate high weft density combined with low crimp, and which retain excellent recovery are to be preferred.

The fibres used to produce the recoverable fabric may be monofilaments, multifilaments or spun staple yarns. Greater flexibility can be attained using multifilament yarns, although problems can be encountered in cross-linking due to the high surface area. Examples of polymeric materials that may be used include polyolefins such as polyethylene (especially HDPE) and polypropylene, polyamides, polyesters and fluoropolymers such as FEP, ethylene perfluoro copolymer, polyvinylidine fluoride and TFE copolymers. The recovery temperature, by which we mean that the temperature at which recovery will go substantially to completion, is preferably 60° C. or more, more preferably from 80°-250° C., most preferably from 120°-150° C.

A non-recoverable fibre may be used as a reinforcement or supplement to the recoverable fibres, or may constitute the major component in one or more dimensions of the fabric. The following non-recoverable materials may be regarded as illustrative: glassfibres, carbon fibres, wires or other metal fibres, polyesters, aromatic polymers such as aromatic polyamides for example Kevlar (trade name), imides and ceramics. The non-recoverable component may be permanent, giving the recovered article enhanced strength etc., or may be present in discrete form only to locate the recoverable component during installation.

The means by which the fabric is rendered substantially impervious may be a polymeric matrix material which extends throughout the fabric, and the following discussion is in terms of the use of a polymeric material. Such a system, which is disclosed in U.K. patent application No. 8300218, preferably comprises a composite structure of a heat-recoverable fabric and a polymer matrix material wherein:

(a) the heat recoverable fabric comprises fibres that will recover when heated, the fibres having a recovery stress Y of at least $5 \times 10^{-2}$ preferably at least $5 \times 10^{-1}$ more preferably at least 1 MPa at a temperature above their recovery temperature; and (b) the polymer matrix material has an elongation/-temperature profile such that there exists a temperature (T) which is at or above the recovery temperature of the fibres at which temperature the polymer matrix material has an elongation to break of greater than 20% and a 20% secant modulus X of at least $10^{-2}$ MPa (measured at a strain rate of 300% per minute), and at which temperature the inequality is satisfied:

$$\frac{X}{Y}\left(\frac{1-R}{R}\right)$$

is less than one, preferably less than 0.5, more preferably less than 0.05.

wherein R is the mean effective volume fraction of heat-recoverable fibres in the composite structure along a given direction based on the total volumes of the composite structure, or relevant portion thereof.

In a further embodiment the recoverable fabric of the invention provides the recoverable fibres of a recoverable composite structure comprising a cross-linked polymeric material and cross-linked recoverable fibres by virtue of which the composite is recoverable.

Such a recoverable composite structure can be made by applying to the cross-linked recoverable fibres the polymeric material, and then cross-linking the polymeric material.

The fibres may be cross-linked to increase their post-recovery strength, and a recovery stress of at least 1 MPa, preferably 1.5 to 5 MPa will be suitable. The polymeric material is desirably cross-linked to prevent it dripping or running during heat recovery, particularly by means of a torch. Too much cross-linking of the polymeric material will, however, reduce the recovery ratio of the composite. This may be a problem since a different extent of cross-linking treatment may be required in the fibres and the polymeric material. This is a reason for the two cross-linking steps being carried out separately above. The problem may arise due to different cross-linking responses (beam response in the case of irradiation cross-linking) of the materials used for the fibres and the polymeric material, or due to the treatment undergone by the fibres and polymeric material. This second effect includes the reduced beam response of the fibres that results from their orientation produced by drawing to make them recoverable.

The composite structure may, nonetheless, be produced using a single cross-linking step if the beam response of the recoverable fibres relative to that of the polymeric material is such that a post-irradiation recovery stress of the fibres, per se, of at least 1 MPa can be reached before the recovery ratio of the composite structure is reduced to a value of 70% of that of the unirradiated composite structure.

The relative beam response may be produced by the presence of prorads in the recoverable fibres and/or antirads in the polymeric material.

In a preferred embodiment of the invention the fabric is incorporated into a flexible recoverable composite structure comprising a recoverable fabric and a polymeric matrix material laminated thereto, in which:

(a) the recoverable fabric comprises a cross-linked recoverable polyolefin having a recovery stress of 1.5 to 5 MPa; and (b) the matrix is cross-linked such that the recovery ratio available in the composite is at least 65% of that available in the free fabric, and the polymeric matrix material, per se, after irradiation has room temperature elongation 400–700% measured at a strain rate of 300% per minute.

Irradiation, in addition to providing one means of cross-linking, can provide other features in the composite structure. If the fibres are irradiated, particularly in the presence of oxygen, before application of the polymeric material then a change in the surface properties of the fibres may occur (such as oxidation) which improves adhesion between the fibres and the polymeric material. An irradiation step after application of the polymeric material may also aid such bonding by forming a cross-linked bond between the two components of the composite structure.

Also, or instead depending on the conditions under which the polymeric material is applied, some mechanical interlocking between the fibres and the polymeric material may be provided.

The polymeric matrix material may be thermoplastic or elastomeric. Examples of thermoplastic materials include: ethylene/vinyl acetate copolymers, ethylene/ethyl acrylate copolymers, LLDPE, LDPE, MDPE, HDPE, polypropylene, polybutylene, polyesters, polyamides, polyetheramides, perfluoroethylene/ethylene copolymers, and polyvinylidene fluoride The following is a list of preferred elastomeric materials: ABS block copolymers, acrylics including acrylates, methacrylates and their copolymers, high vinyl acetate copolymers with ethylene, polynorbornene, polyurethanes and silicone elastomers. These materials are preferably cross-linked, and this is conveniently carried out by subjecting the fabric to a suitable cross-linking agent after the fabric has been rendered impervious by incorporating the polymeric material.

The precise technique by means of which the fabric is rendered substantially impervious will of course depend on whether, for example, a polymeric material is simply used in conjunction with the fabric, is adhered to a surface (preferably an inner surface) of the fabric, extends throughout the fabric, or is introduced in some other way. The extent of mechanical interaction required between the fabric and the polymeric material will depend on the extent of bonding that can be achieved during manufacture, and this is a function of the difference between the melt or softening temperature of the polymeric material and the recovery temperature of the fabric. Unless a further stretching operation is to be carried out later, recovery should not occur at this stage. Recovery could of course be avoided by mechanically holding the fabric, but this tends to make incorporation of the polymeric material rather complex. Suitable techniques for coating the fabric with a polymeric material which achieve at least some penetration include press lamination, hot coating from the melt between rollers, spray coating, dip coating and powder coating.

The amount of polymeric material used should be sufficient to render the fabric substantially impervious to air when it is recovered. It is possible, therefore, for the polymeric material to be a discontinuous coating or impregnation before recovery, and optionally to melt or soften sufficiently and be brought together on recovery to provide a substantially impervious barrier. We prefer, however, that the composite of fabric and polymeric material be substantially impervious before as well as after recovery. The thickness of the polymeric material should be great enough to allow the desired pressure, if any, to be retained, but small enough to allow the fabric to recover to the desired extent. The composite desirably recovers as a unit with no appreciable drawing-through of fabric within the matrix. A suitable thickness of polymeric material is 0–0.6 mm preferably about 0.3 mm either side of the fabric. We have found that a layer of unstressed polymeric material of thickness of at least 0.03 mm especially at least 0.2 mm particularly 0.2 to 2 mm on an external surface of the fabric provides a considerable improvement in the ease with which the fabric can safely be recovered using a torch such as a propane torch. Such polymeric layer will generally soften during recovery but has a sufficiently high viscosity that is is retained by the fabric. This is disclosed in a UK patent application No. 8300217.

The composite is preferably coated with an adhesive on that side which will face the substrate to be enclosed, although the polymeric material providing imperviousness may be adhesive under installation conditions. Heat-activatable adhesives are preferred, especially hot-melt adhesives such as polyamides and EVAs. An ideal polyamide adhesive, which is disclosed in UK patent publication 2075991, contains up to 10%, preferably up to 1% of an acrylic rubber and has excellent adhesion to untreated polyethylene, and good low temperature flexibility. The activation temperature of the adhesive should be chosen to correspond to the recovery temperature of the fabric, so that the single step of heating achieves both recovery and bonding. The adhesive need not extend over the entire surface of the sleeve, and in certain situations need only be present at its openings.

A single layer of fabric may be used, or the sleeve may comprise a laminate of two or more layers of fabric, optionally bonded together with a simple layer of adhesive or including a thicker layer interposed between the fabrics.

Another component that may be used with the recoverable fabric described above is a relatively rigid liner. Such liners, which comprise a larger central section and smaller end sections, may be made in many ways. A canister comprising aluminium or other half shells having shaped ends can be provided with hinges or interlocking longitudinal edges for wrap-around installation. This type of canister may be made of sheet material, or may have the appearance of a cage and comprise supporting end rings and a series of longitudinal struts joining them. Such a liner is disclosed in UK Pat. No. 1431167. An alternative liner may be made from a roll of rather stiff material which is wrapped around the splice with a degree of overlap which depends on the degree of heat and mechanical protection required. The material used may comprise a laminate of cardboard or of a plastics material together with layers for reducing heat or moisture vapour transfer. Such liners may therefore include a support layer (preferably cardboard or plastics material), a foam layer for heat resistance, a metal foil layer for water-vapour resistance, and optionally one or more thin films of a polymeric material for further protection. A liner based on cardboard is described in published UK patent application No. 2059873 and one based on a thermoplastics material is disclosed in published UK patent application No. 2069773. The structure just described may constitute merely the central or larger part of the liner as required for this invention, the ends which provide the transitions down to the cables being provided by separate end pieces which serve to support the central region and to provide the desired smooth transitions. Alternatively, the longitudinal edges of the roll of liner material may be provided with a series of slits or may be crowned in order that the edge portions of the installed roll may be collapsed to taper gradually down to the cables. The liner is preferably shaped to avoid any sharp angular change between the central portion and the slope, and between the slope and the cables. If the liner has tapered fingers at its ends a gradual, rounded transition is ensured by the gentle increase in flexibility and consequently in bending along the length of each finger. As mentioned above, these fingers may be part of a unitary liner or may constitute or be part of separate end supports which cary the larger central region of the liner. The angle of the transition (that is of the sloping part relative to the axis of the cable) is preferably less than 60° more preferably less than 45°. We have surprisingly found that recoverable fabrics can be produced which are stable over transitions steeper than 60° or more, by which we mean that unacceptable parting of the fibres by sliding down the transition can be avoided. Where a particularly large transition angle is desired, it may be desirable to provide crimp in the fibres running in the direction along the splice case since this reduces the chance of the longitudinal fibres becoming straight and allowing the circumferential recoverable fibres to fall to one side. The weave type also has an effect, and we have found greater stability for high float fabrics where more longitudinal fibres can be accommodated; hence sateen is preferable to twill, which in turn is better than plain weave.

The liner preferably carries a valve, which may be used to pressurise the splice case of which it forms part, or merely to test pressure. This feature will of course be primarily useful in conjunction with pressurised telephone cables. The valve preferably has a screw-threaded body and is sealed to the liner by means of sealing washers and a nut. The use of a fabric rather than a continuous material as the sleeve has a particular advantage here; it is possible to force a hole (generally after gentle heating) through the fabric without breaking any fibres, and as a result there is no question of any split propagating later during recovery. Even if a hole is drilled or otherwise cut to make way for the valve only a limited number of fibres are severed and the damage will not spread. The valve may be passed through the liner and then through the hole in the fabric sleeve so that its base abuts against the inside of the liner. Various sealing washers are installed and tightened down by means of a nut. Improved sealing can be achieved if the washer which overlies the fabric has a larger hole than the hole in the fabric, since in this arrangement an annular portion of fabric becomes pinched between the top washer and the valve body. The valve can serve also as an earth or screen grounding point, or as a lug for locating the sleeve with respecct to the liner. The last of these features is particularly useful where the liner is cage-like, and the sleeve is wrap-around and has a closure which must overlie one of the bars of the cage. For ease of assembly in the field, the sleeve may be supplied attached to the liner or to part of it by means of the valve.

The liner may be constructed to facilitate re-entry, by which we mean at least partial removal of an old recovered sleeve in a way that does not damage the underlying cables, and rebuilding of the splice case with a new recoverable sleeve. One technique is to cut the old sleeve circumferentially at each transition, and longitudinally between the two circumferential cuts. This allows a central portion of the old sleeve to be removed, leaving behind its ends which remain sealed to the cables. Where the old sleeve was a wrap-around sleeve having an upstanding closure means, it is usual to cut-off this closure means before making the cuts referred to above. After the cable splice has been attended to a new sleeve is installed to bridge the remaining butts of the old sleeve. It is desirable that the central portion of the old sleeve can be removed without destroying the liner. To this end UK patent publication No. 2093402 proposes that a liner be provided with an overlying moisture-barrier foil layer which can become bonded to the overlying sleeve but which remains separable from the liner.

Where the assembly of the invention is used to enclose a splice between pressurised cables a further component is preferably included. Pressure within a splice case tends to put any seal between the recovered sleeve and the ingoing cables into peel. This problem was recognised and a solution found in UK patent publication No. 2040106, where it was proposed that one should use one or more flexible auxiliary members interposed between the sleeve and the cable and so positioned as to be able to be deformed by forces generated by the internal pressure so that one portion of the member is forced against the sleeve and another portion is forced against the cable. As a result, peel between the outer sleeve and the cable is replaced by shear between the auxiliary member and the cable and between the auxiliary member and the sleeve.

One embodiment of the auxiliary member disclosed in UK patent publication No. 2040106 is a strip of substantially U or V shaped cross-section which is wrapped around the cable at the region where the sleeve meets the cable. One limb of the U or V becomes bonded to the cable and the other to the sleeve, with the opening facing into the splice case. The auxiliary member may contain an adhesive, such as a hot-melt adhesive, a strip of foil for heat protection, and release paper to cover the adhesive until it is needed.

An alternative embodiment, which allows the auxiliary member to be cut to a length according to the circumference of the cables, includes a highly elastic rubber or a foam instead of the U or V shaped strip. The rubber or foam is bonded to a strip of adhesive, the other side of which is attached to a strip of aluminium foil. The rubber or foam may be coated with a pressure sensitive adhesive to aid installation. Pressure within the splice case acts on the rubber or foam causing it to splay out against the cable and the sleeve.

Where an enclosure has to be built around a simple end-to-end joint between two cables a simple sleeve can be used which shrinks into contact with each cable. However, problems may arise where two or more cables or other substrates have to be sealed at one position. This problem, which is known as branch-off, occurs in a cable splice where one cable is divided into two. This problem can be overcome by providing means for holding together circumferentially spaced portions of the end of the fabric sleeve to close at least partially the crutch region between the diverging cables. The seal is conveniently completed by an adhesive on the inner surface of the sleeve which melts or otherwise becomes activated as the sleeve recovers. A solution is proposed in UK patent publication No. 2019120, where a branch-off seal is formed by:

(a) positioning a clip having at least two elongate legs over the outer surface of a recoverable sleeve at an end thereof so as to form at least two terminal conduits;

(b) positioning substrates within the conduits; and (c) applying heat so as to effect recovery and to form the desired seal.

The clip preferably has three legs, the central leg being coated with an adhesive and being positioned within the sleeve. This allows a greater amount of adhesive to be provided in the crutch region. The clip, preferably its central leg, may be hollow and provided with a pressure access point, or with means for monitoring temperature in the crutch region.

The problem of branch-off can, however, be overcome by producing the fabric sleeve in the correct shape to accomodate two or more branching substrates. This solution is particularly applicable to fabrics, and offers significant advantages. A fabric can be produced, especially by knitting, which has for example one outlet at one end and two at another end. Such an article can still be wrap-around since closure mechanisms may be provided for each outlet.

An alternative technique involves installing around the cables a flexible seal which comprises an envelope containing a composition which can undergo a change from lower to higher viscosity. The seal transforms the concave surfaces in the crutch region to a flat or convex surface to which the fabric can seal. This is disclosed in copending UK patent application No. 8221597, the disclosure of which is incorporated herein by reference.

The following example is given to illustrate an article built from preferred materials.

EXAMPLE

Employing a melt spinning line, HDPE monofilament of 0.35 mm nominal diameter was produced with varying degrees of draw such that the properties following 15 Mrads of electron irradiation in air at 0.25 Mrads/minute were as shown in Table 1.

TABLE 1

| Fibre No. | 1 | 2 | 3 | 4 | 5 | 6 |
| --- | --- | --- | --- | --- | --- | --- |
| % Rec | 88.5 | 80 | 72 | 60 | 41 | 10 |
| Gel Content % | 58 | 62 | 63 | 68 | 68 | 70 |
| Rec. Force MPa | 1.2 | 1 | 0.7 | 0.6 | 0.4 | 0.1 |

A non-recoverable Terylene (Trade name) multifilament yarn type 125, 3×1100 dTex(designated fibre 7) was employed in conjunction with fibres 1–6 to prepare a warp beam having the following fibre arrangement and a total of 2360 ends for a 1 m width.

177 ends fibre 1
23 ends fibre 2
24 ends fibre 3
23 ends fibre 4
24 ends fibre 5
24 ends fibre 6
590 ends fibre 7
24 ends fibre 6
24 ends fibre 5
23 ends fibre 4
24 ends fibre 3
23 ends fibre 2
177 ends fibre 1

This was then repeated to yield a total width of 1 m.

This warp was used to prepare a fabric of 8 shaft sateen construction with a float of 7 employing Kevlar (trade name) aramid fibre of 2×1670 dTex as the weft. The resultant fabric density was 24/5 yarns/cm.

This sheet was extrusion coated with LDPE on both surfaces to a thickness of 0.15 mm, and the resultant extrusion coated sheet further coated with a polyamide based adhesive and then slit down its centre to provide two symmetrically zoned sheets.

Each sheet was then cut transversely (ie across the recoverable warp) to produce pieces of fabric of sufficient size to be wrapped around a splice in a telecommunications cable. The sizes chosen were about 25 cm, 38 cm and 48 cm which are suitable for 50, 200 and 400 pair cables respectively.

At each warp edge a closure rail was produced by folding back the last 2 cms of sheet around a nylon rod, and bonding. The two edges bearing the closures can then be brought together and secured by a C-shaped channel.

Each of these sleeves was used in conjunction with a liner which comprised an aluminium canister of about 75% of the length of the sleeve and having crowned ends which could be deformed to provide smooth 30° transitions. The diameter of the canisters were chosen to be about 75–90% of the diameter of the assembled sleeve in order to ensure some degree of unresolved recovery. The variation in recovery ratios along the length of the sleeve matched the variation in diameter of the cable splice to be covered. Pressure tests were then carried out on splice cases built up using the above liner and sleeves recovered over a polyethylene jacketed telephone cable. The cable had a 0.5 cm hole cut in its jacket for pressure communication with the inside of the splice case. The splice cases were put under pressure of 70 KPa (10 psi) and cycled between −40° and +60° C. for 100 cycles at 3 cycles per day. The splice cases were also tested in water at 105 KPa through 100 cycles between 5 and 50° C. No leaks or breaks were detectable, indicating a high degree of pressure retention. The amount of creep detected was minimal and in some cases not detectable.

Figure 2:
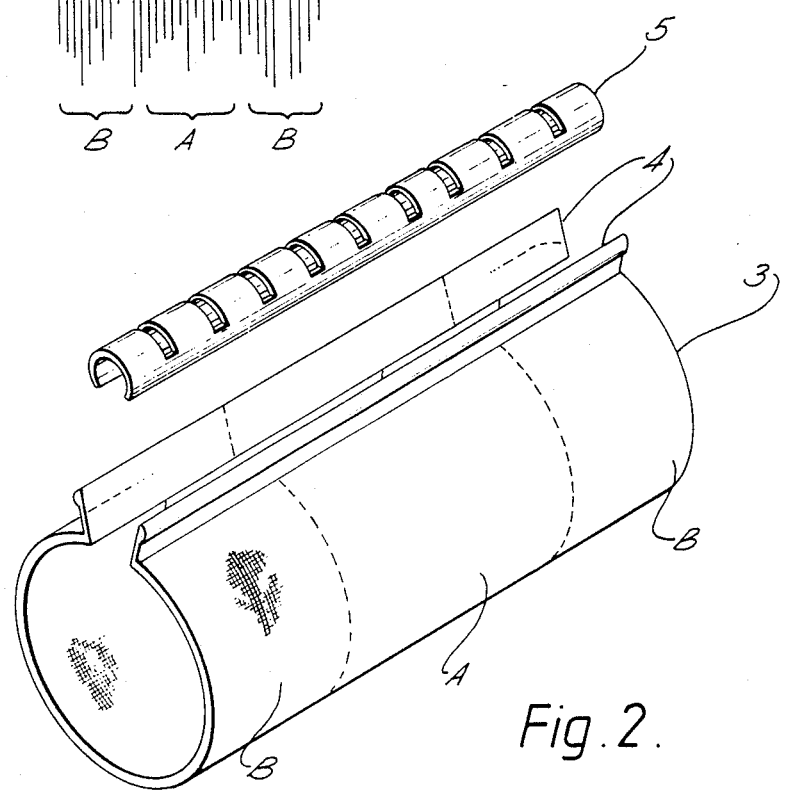
Figure 3:
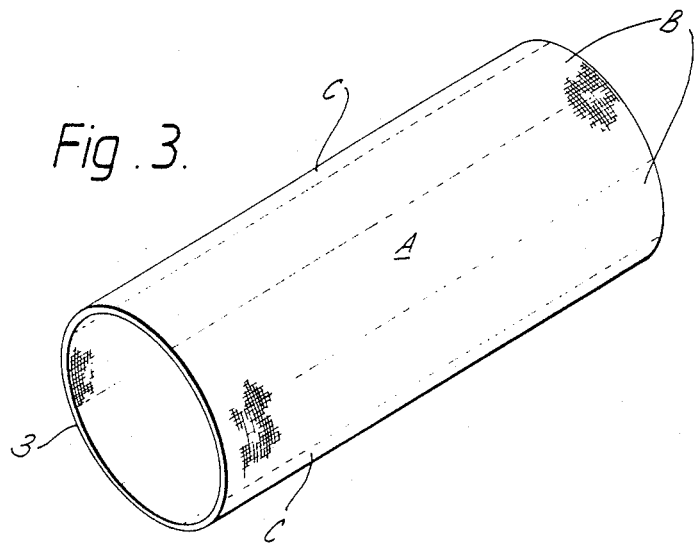
Figure 4:
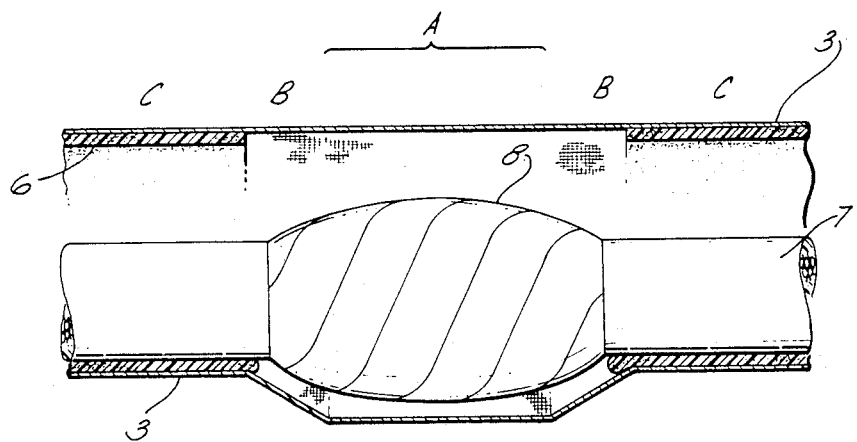

The invention is further illustrated with reference to the accompanying drawings, in which:

FIG. 1 shows a fabric being woven;
FIG. 2 shows a wrap-around sleeve;
FIG. 3 shows a tubular sleeve;
FIG. 4 shows a sleeve used to cover a splice in a cable.;
FIG. 5 shows a sleeve used to cover a joint in a pipe; and
FIG. 6 shows a sleeve over a substrate of noncircular cross-section.

In FIG. 1 a woven fabric is produced from a recoverable warp 1 and a non recoverable weft 2. The warp frame includes fibres of different recovery to produce the zones A and B. The zone A has zero recovery, and zones B increasing recovery from the centre of the weave outwards. The recovery can increase uniformly outwards or it can be constant over a series of smaller zones, such as the six recoverable zones in the preceding example. The zones of recovery can be made from fibres of uniform recovery ratio, or by a varying mix of a variety of recovery ratios such that the bulk effect is a uniform variation.

FIG. 2 shows a sleeve 3 with closure rails 4, to be held together by a closure channel 5, substantially C-shaped in cross-section.

FIG. 3 illustrates a tubular recoverable sleeve, with zones of different recovery running longituidinally. Recovery itself may run longitudinally or circumferentially. Here a non recoverable zone A is bordered by zones B and C of increasing recovery. Where recovery is longitudinal, the sleeve will assume a bent shape. This is useful for void free encapsulation of pipe bends where the different lengths of the pipe on the outer and inner curves of the bend must be accomodated.

In FIG. 4 a sleeve 3 coated with an adhesive 6, such as a hot-melt or other heat-activatable adhesive, is shown before recovery (above) and after recovery (below) a splice 8 between two cables 7.

FIG. 5 is similar, but shows a flanged joint 10 between two pipes 9. The zones B of intermediate recovery reduce the chance of splitting over the sharp transition. This can be a problem for uniformly recoverable sheet of high recovery.

In FIG. 6 a sleeve 3 has radial recovery but zoned longitudinally, the zone B being of higher recovery than zones A. Where friction becomes a problem between the sleeve 3 and a substrate 11 of non-circular cross-section the flat portion 12 of the substrate is likely not to be properly protected by the sleeve after recovery. This is because the recovery forces cannot be freely transmitted around the sleeve. The solution is to provide a zone B of higher recovery.

We claim:

1. A hollow recoverable sleeve suitable for environmental protection of a substrate, which comprises:
   a recoverable fabric having a plurality of zones respective zones having different recovery ratios or forces, the fabric having been woven from a plurality of fibres of different recovery ratios or forces, respective fibres corresponding to respective zones;
   a polymeric matrix material by means of which the fabric is rendered substantially impervious;
   the sleeve having a length greater than its diameter.

2. A sleeve according to claim 1, in which the fabric is woven from recoverable polymeric warp fibres, the warp frame comprising zones of fibres of different recovery.

3. A sleeve according to claim 2 in which the fibres are cross-linked before weaving.

4. A sleeve according to claim 1, in which the fabric is a plain weave, a twill, a satin, or a braid, a knit or a non-woven fabric.

5. A sleeve according to claim 4, in which the fabric is a weave having substantially heat-stable weft, or substantially heat-stable warp.

6. A sleeve according to claim 1, in which the surface of the fabric is substantially developable before recovery and is not developable after recovery.

7. A sleeve according to claim 1, in which the fabric contains glass fibres or fibres of an aromatic polyamide.

8. A sleeve according to claim 1, in which the fabric is rendered substantially impervious by means of a polymeric material adhered to at least one surface of the fabric.

9. A sleeve according to claim 1, which additionally comprises a liner having a central tubular portion and end portions of generally frustoconical shape when in use.

10. A sleeve according to claim 9, in which the liner comprises a layer of material which can be wrapped around the substrate and which has crowned end regions by means of which the transitions can be produced.

11. A sleeve according to claim 1, in which the fabric is radially recoverable.

12. A sleeve according to claim 11, in which the recovery ratios at end portions of the sleeve are greater than the recovery ratio at a central portion.

13. A sleeve according to claim 1, which additionally comprises at least one auxiliary member which can be interposed between the fabric and the substrate and so positioned as to be able to be deformed by forces generated by pressure within the article so that one portion of the member is forced against the fabric and another portion is forced against the substrate.

14. A sleeve according to claim 1, capable of sealing a branch-off between at least two substrates, and which additionally comprises means for holding together circumferentially spaced portions of the fabric to close at least partially the branch-off between the substrates.

15. A sleeve according to claim 14, in which the means for holding is a clip having at least two legs.

16. A sleeve according to claim 1, in which the fabric has an internal coating of a heat-activatable adhesive.

17. A sleeve according to claim 1, in which the fabric is heat-recoverable.

18. A sleeve according to claim 1, in which the cover portion has a temperature indicating composition on an external surface which changes colour indicating recovery of the fabric or activation of an internal coating of a heat-activatable adhesive.

19. A sleeve according to claim 1, in which the sleeve has a wraparound configuration.

20. An elongate substrate or a junction between elongate substrates when enclosed by a sleeve according to claim 1.

21. A substrate or a junction according to claim 20, in which the or each substrate is a electrical cable.

22. A substrate or a junction according to claim 20 in which the or each substrates is a telecommunications cable.

23. A substrate or a junction according to claim 22, in which the cable is a pressurised cable.

24. A substrate or junction according to claim 20, in which the or each substrate is a pipe.

* * * * *

UNITED STATES PATENT AND TRADEMARK OFFICE
CERTIFICATE OF CORRECTION

PATENT NO. : 4,803,103
DATED : February 7, 1989
INVENTOR(S) : Kenneth B. Pithouse, et. al.

It is certified that error appears in the above-indentified patent and that said Letters Patent is hereby corrected as shown below:

On the Title page, item [73], Assignee: should read -- Raychem Limited, London, England --.

Signed and Sealed this

Twenty-eighth Day of June, 1994

Attest:

BRUCE LEHMAN

*Attesting Officer*  *Commissioner of Patents and Trademarks*